(No Model.)
F. L. STONE.
ADJUSTABLE WRIST PIN.
No. 530,910. Patented Dec. 11, 1894.
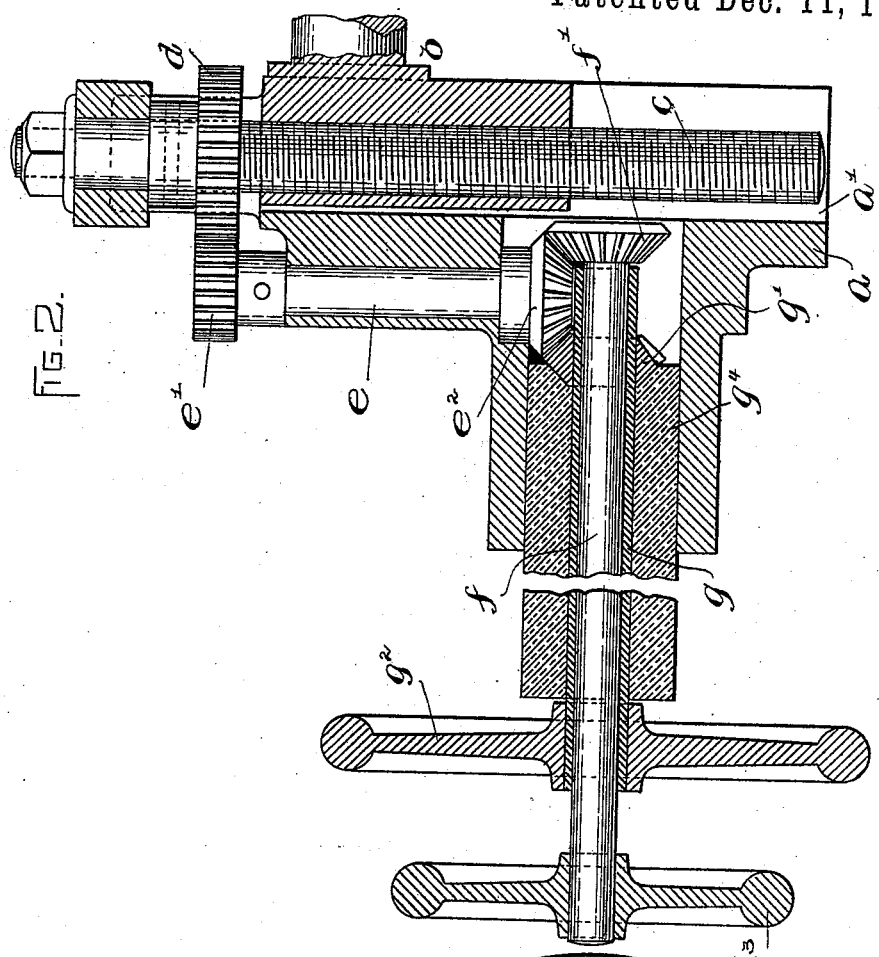
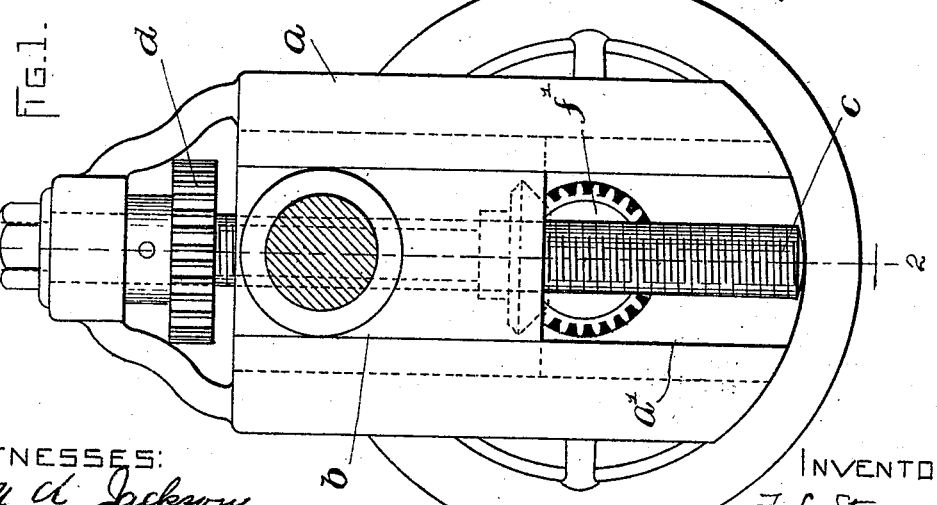
WITNESSES:
M. A. Jackson
F. P. Davis
INVENTOR:
F. L. Stone
by Wright Brown Crosby
Attys.

UNITED STATES PATENT OFFICE.

FLORENTINE L. STONE, OF BROCKTON, ASSIGNOR OF TWO-THIRDS TO THE BOUVÉ, CRAWFORD & COMPANY CORPORATION, OF BOSTON, MASSACHUSETTS.

ADJUSTABLE WRIST-PIN.

SPECIFICATION forming part of Letters Patent No. 530,910, dated December 11, 1894.

Application filed January 3, 1894. Serial No. 495,530. (No model.)

*To all whom it may concern:*

Be it known that I, FLORENTINE L. STONE, of Brockton, in the county of Plymouth and State of Massachusetts, have invented certain new and useful Improvements in Adjustable Wrist-Pins, of which the following is a specification.

The object of the present invention is to provide means whereby a wrist-pin may be adjusted with respect to the center of rotation of its support while the latter is in motion, and by the motion of the support.

The accompanying drawings illustrate a construction for carrying out the invention.

Figure 1 shows a front elevation with the wrist-pin proper in section. Fig. 2 shows a longitudinal section.

The letter $a$ designates a disk or other rotary support for a wrist-pin, said disk being formed with a radial slide-way $a'$. A wrist-pin $b$ is formed with a base which fits said slide-way, and by adjustment therein may have the length of its throw regulated. A screw $c$ is supported radially in a bearing on the disk and passes through the wrist-pin, said screw turning loose in its bearing and engaging a screw-threaded bore in the wrist-pin. A spur-gear $d$ is affixed on the screw, and a spindle $e$ is supported in a radial bearing on the disk and carries affixed to it a spur-gear $e'$ in mesh with the gear $d$, and also has affixed to it at its inner end within the tubular hub of the disk, a bevel gear $e^2$. A spindle $f$ is rotatively supported concentrically with the disk and has affixed to its inner end a bevel-gear $f'$ in mesh with the bevel-gear $e^2$.

A spindle in the form of a sleeve $g$ is rotatively mounted on the spindle $f$ and supported in a bearing $g^4$, and carries affixed to it a bevel-gear $g'$ which meshes with the gear $e^2$. The spindle $f$ has a hand-wheel $f^3$ affixed to it, and the sleeve $g$ has a handle $g^2$ affixed to it. When neither of these handles is disturbed, the adjustment of the crank-pin remains unchanged. If it is desired to adjust the wrist-pin in one direction, the handle $f^3$ is taken hold of and held and thus the gear $f^2$ is stopped which causes the gear $e^2$ and the radial spindle $e$ to turn and consequently the screw, and thereby the wrist-pin is moved to the position desired. To adjust the wrist-pin in the opposite direction, the handle $g^2$ is taken hold of and held, which produces rotation of the radial spindle $e$ in the reverse direction, and moves the pin in the opposite direction from before. Thus the wrist-pin may be adjusted to obtain the desired throw without stopping the rotary support, but by employing the rotary motion of the same to effect the desired movement of the wrist-pin.

It is evident the invention may be carried out by other means than here shown and is not limited in this respect.

Having thus explained the nature of the invention, I declare that what I claim as new, and desire to secure by Letters Patent, is—

1. The combination of a wrist-pin movable toward and from the center of its support, a screw engaging said wrist-pin a radial spindle on said support, gears connecting said spindle with the said screw, a spindle journaled concentric with the rotary support and having a handle, and gearing connecting said concentric spindle with the radial spindle.

2. The combination of a wrist-pin movable toward and from the center of rotation of its support; a pair of handles independently journaled concentric with said support; and adjusting connections between each of said handles and the wrist-pin rotatively connecting the handles with the rotary support when said handles are free to turn, and effecting movement of the wrist-pin toward or from the center of rotation, according as one handle or the other is held from turning, substantially as described.

3. The combination of a wrist-pin movable toward and from the center of rotation of its support, two spindles both rotatively supported concentric with the said support, and gearing operatively connecting the spindles with the wrist-pin.

4. The combination of a wrist-pin movable toward and from the center of rotation of its support, a screw engaging said wrist-pin, and a pair of spindles rotatively supported concentric with the said support, and operatively connected with said screw.

5. The combination of a wrist-pin movable toward and from the center of rotation of its support, a screw engaging said wrist-pin, a spindle extending radially of the said support and geared to the said screw and carrying a bevel pinion, and two spindles rotatively supported concentric with the support and each carrying a bevel-gear in mesh with that on the radial spindle.

In testimony whereof I have signed my name to this specification, in the presence of two subscribing witnesses, this 15th day of December, A. D. 1893.

FLORENTINE L. STONE.

Witnesses:
 F. M. BIXBY,
 W. F. KANE.